(No Model.)

G. W. MOORE.
LADDER AND FRUIT CONVEYER.

No. 329,668. Patented Nov. 3, 1885.

WITNESSES:
Theo. G. Hoster
C. Sedgwick

INVENTOR:
G. W. Moore
BY Munn & Co
ATTORNEYS.

UNITED STATES PATENT OFFICE.

GEORGE W. MOORE, OF DUNEDIN, FLORIDA.

LADDER AND FRUIT-CONVEYER.

SPECIFICATION forming part of Letters Patent No. 329,668, dated November 3, 1885.

Application filed May 15, 1885. Serial No. 165,655. (No model.)

*To all whom it may concern:*

Be it known that I, GEORGE W. MOORE, of Dunedin, in the county of Hillsborough and State of Florida, have invented a new and Improved Combined Ladder and Fruit-Conveyer, of which the following is a full, clear, and exact description.

The object of my invention is to combine a ladder with a fruit-conveyer in such a manner that fruit can be conveyed without injury to the ground or into a suitable receptacle from any point of the ladder.

The invention consists in a ladder to which is secured in any suitable manner a fruit-conveyer, which consists of a box provided with inclines and openings in the front of the box.

The invention also consists in various parts and details, hereinafter more fully set forth and described.

Reference is to be had to the accompanying drawings, forming part of this specification, in which similar letters of reference indicate corresponding parts in both the figures.

Figure 1:
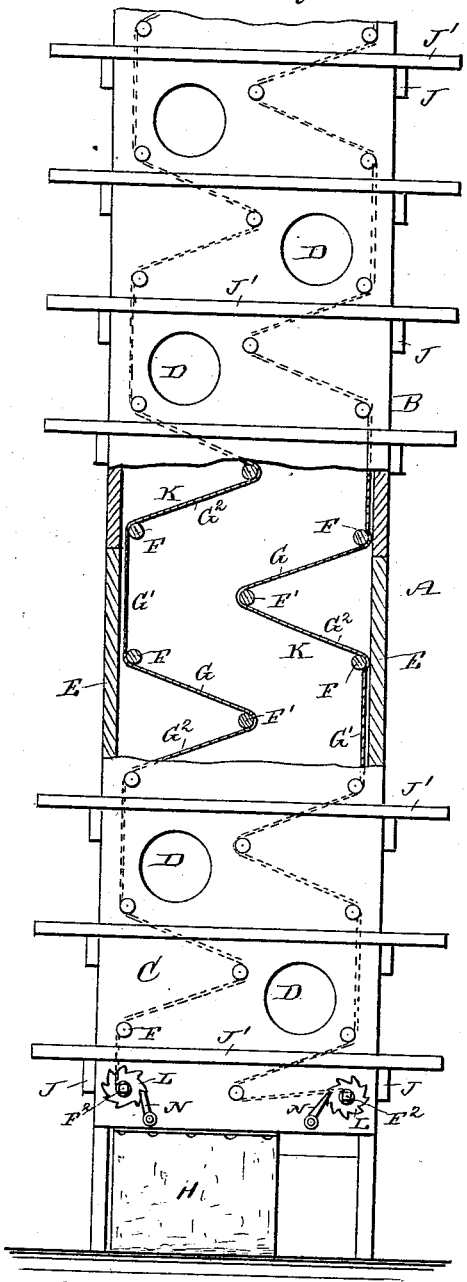
Figure 2:
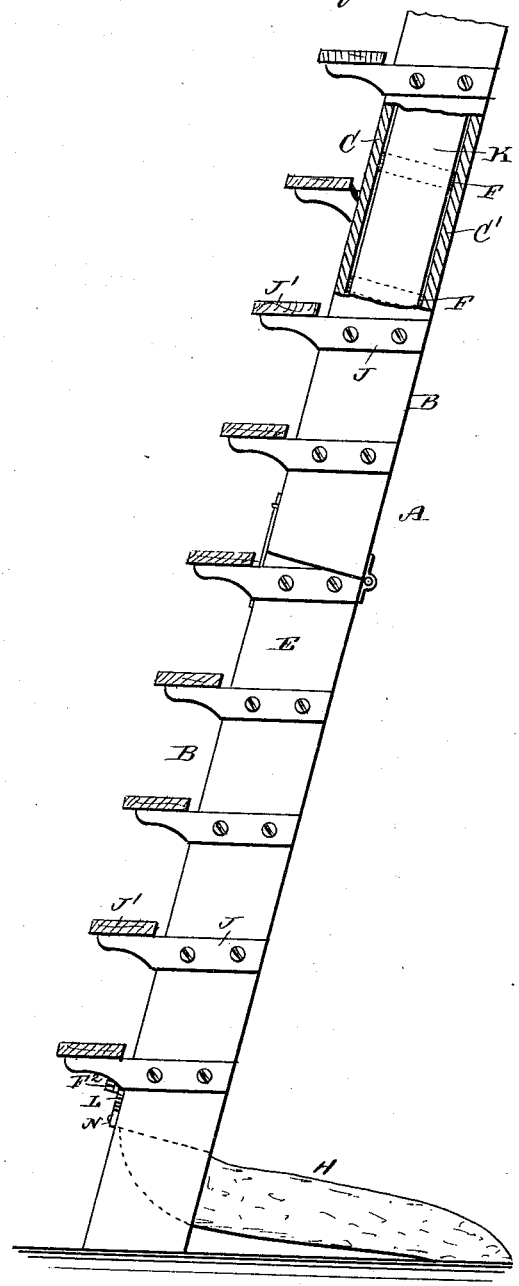

Figure 1 is a front elevation, partly in section, of my combined ladder and fruit-conveyer; and Fig. 2 is a side elevation, partly in section, of the same.

The fruit-conveyer A is provided with a box, B, open at the top and bottom, which consists of the front plate, C, the rear plate, C', and the side plates, E and E. The front plate, C, is provided with alternate openings D near its edges.

On the inside of the box B, and between the front and rear plates, C and C', are secured stays F, near the inner edges of the side plates, E and E, and stays F', in the center of the box B. The stays F and F' are connected with each other by a lining, K, of wood or metal covered with cloth, to form the inclines G, reaching alternately from the center stays, F', to the inside stays, F. The side stay F on the upper end of the incline G is connected to the next side stay F above by the vertical lining G', and this side stay F is connected to the center stay, F', by the inclined lining G².

To the lower open end of the box B is attached an inclined apron, H, extending from the box any suitable distance. The side plates, E E, are provided with brackets J, projecting on the front of the box B, and to which are secured the steps J', which form the ladder.

The ladder may be of usual construction, and the conveyer A, as above described attached to it in any suitable manner.

The operation is as follows: The combined ladder and conveyer is placed against the tree, and the fruit-picker having ascended the steps J', passes the fruit at any point into the opening D on the front plate, C, of the box B. The fruit falls onto the nearest incline G, and rolls from there downward to the opposite incline G, and on downward from one incline G to the other until it reaches the apron H, which conveys the fruit to the ground or in any suitable receptacle placed under the end of the apron H.

The conveyer A can be made in sections, hinged to each other on the rear plate, C', and fastened by hooks and staples or other suitable devices on the front plate, C.

The inclines G can be made adjustable to increase or diminish the inclination by placing the side stays, F, in movable strips running the entire length of the box B, and held in place by cleats or working in grooves.

The lining K, of wood or metal, covered with cloth, can be substituted by a strip of cloth covering the stays in the same manner as the lining K. The ends of each strip are fastened to the last side stay, F², on the top and the bottom of box B, which last stays F² are each provided with a ratchet-wheel, L, and a pawl, N, to take up the slack of the cloth covering.

Having thus described my invention, I claim as new and desire to secure by Letters Patent—

1. A ladder to which is attached a fruit-conveyer, substantially as shown and described.

2. A ladder to which is attached a fruit-conveyer provided with alternate inclines and openings, through which the fruit is passed, substantially as shown and described.

3. A ladder to which is attached a fruit-conveyer, provided with alternate inclines and openings, through which the fruit is passed, and an inclined apron near the bottom of the conveyer, substantially as shown and described.

4. A fruit-conveyer, A, provided with a box, B, open at the top and bottom, and provided with the stays F and F' and lining K, forming the alternate inclines G, substantially as shown and described.

5. In a fruit-conveyer, A, the box B, open at the top and bottom, the stays F and F', the lining K, forming the alternate inclines G, in combination with the apron H, substantially as herein shown and described.

6. In a fruit-conveyer, A, the box B, open at the top and bottom, and provided with the front plate, C, having the alternate holes D, the stays F and F', the lining K, forming the alternate inclines G, and the apron H, in combination with the brackets J and steps J', substantially as shown and described.

GEORGE W. MOORE.

Witnesses:
JAMES SOMERVILLE,
JOHN O. DOUGLAS.